United States Patent
Matsumoto et al.

(10) Patent No.: US 6,718,052 B1
(45) Date of Patent: Apr. 6, 2004

(54) IMAGE EMPHASIZING DEVICE FOR FINGERPRINT VERIFICATION

(75) Inventors: Noriyuki Matsumoto, Nagoya (JP); Taizo Umezaki, Tajimi (JP); Akihito Kimura, Nagoya (JP)

(73) Assignee: Chuo Hatsujo Kabushiki Kaisha, Aichi (JP)

( * ) Notice: Subject to any disclaimer, the term of this patent is extended or adjusted under 35 U.S.C. 154(b) by 0 days.

(21) Appl. No.: 09/521,943

(22) Filed: Mar. 9, 2000

(30) Foreign Application Priority Data

Mar. 11, 1999 (JP) .......................................... 11-064285

(51) Int. Cl.[7] .............................................. G06K 9/00
(52) U.S. Cl. ................................................... 382/125
(58) Field of Search ........................... 382/124, 125, 382/195, 115, 280, 260, 199, 100; 356/71; 250/550; 359/560, 561, 559; 707/100

(56) References Cited

U.S. PATENT DOCUMENTS

| | | | | |
|---|---|---|---|---|
| 5,050,220 A | * | 9/1991 | Marsh et al. ................. | 382/43 |
| 5,426,708 A | * | 6/1995 | Hamada et al. .............. | 382/125 |
| 5,619,596 A | * | 4/1997 | Iwaki et al. ................. | 382/278 |
| 5,761,330 A | * | 6/1998 | Stoianov et al. ............. | 382/280 |
| 5,854,710 A | * | 12/1998 | Rao et al. .................... | 359/559 |
| 5,915,034 A | * | 6/1999 | Nakajima et al. ............ | 382/210 |
| 6,018,586 A | * | 1/2000 | Kamei .......................... | 382/124 |

* cited by examiner

Primary Examiner—Jayanti K. Patel
(74) Attorney, Agent, or Firm—Morgan Lewis & Bockius LLP

(57) ABSTRACT

A minute amplitude value emphasis device 2 has Fourier transformation devices 211, 212 which treat a two-dimensional original pictorial image 200 with a Fourier transformation to determine Fourier coefficients in x-axis and y-axis directions. Weight devices 221, 222 emphasize the respective Fourier coefficients in the corresponding directions so as to produce weighted Fourier coefficients. Inverse Fourier transformation devices 231, 232 treat the weighted Fourier coefficients with an inverse Fourier transformation in two directions to determine the corresponding minute amplitude value emphasis data 241, 242. A synthesizing device 250 synthesizes the corresponding minute amplitude value emphasis data 241, 242 to produce a minute amplitude value emphasis image 260. An obscure portion of the two-dimensional original pictorial image 200 is rectified to reproduce a clarified pictorial image.

13 Claims, 6 Drawing Sheets

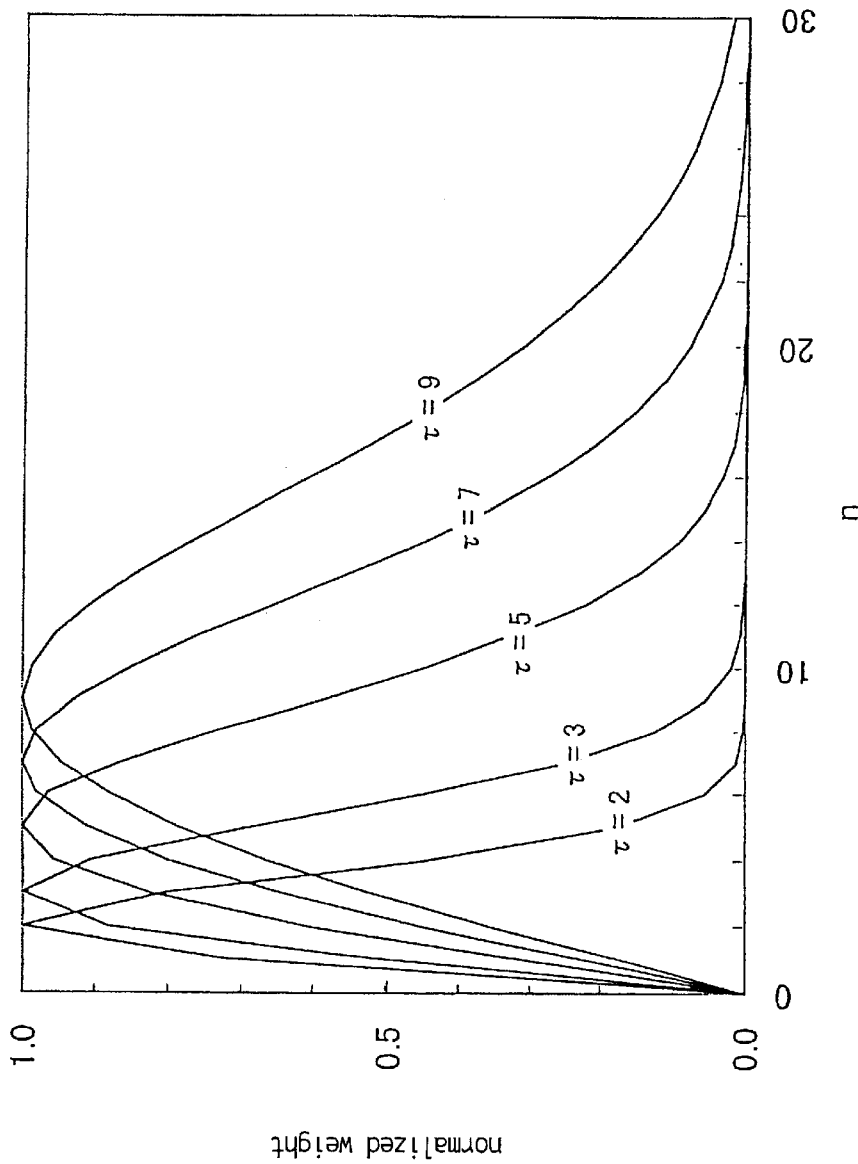

IMAGE EMPHASIZING DEVICE FOR FINGERPRINT VERIFICATION

BACKGROUND OF THE INVENTION

1. Field of the Invention

The invention relates to an image emphasizing device which clarifies a two-dimensional pictorial image data and fingerprint image data.

2. Description of Prior Art

In an individual identification device, features are derived from a fingerprint image based on end points and bifurcation points of fingerprint ridge lines when putting a finger tip on an extraction prism. The derived features are stored in a memory as a registration data. Unknown features from an entrant are collated with an already stored features to verify whether or not the entrant is identified.

Upon reading the fingerprint image, it is necessary to attain a well-contrasted fingerprint image particularly when selecting the number of the ridge lines and a positional relationship between the end points of the ridge lines or the bifurcation points of the ridge lines.

When the finger tip gets chappy in a dry season, the ridge lines of the fingerprint image becomes lean and blurred in some places due to a poor contact relation between the finger tip and the extraction prism at the time of putting the finger tip on the extraction prism. This means that the fingerprint image is qualitatively influenced depending on the circumstances under which the fingerprint is taken. This significantly deteriorates a collating accuracy.

Therefore, the present invention has been made with the above drawbacks in mind, it is a main object of the invention to provide an image emphasizing device which is capable of reproducing a clear image by emphasizing an obscure portion of an original pictorial image.

SUMMARY OF THE INVENTION

According to the present invention, there is provided an image emphasizing device in which a Fourier transformation member regards a two-dimensional original pictorial image as a time series data to treat the two-dimensional original pictorial image with a Fourier transformation in different directions so as to determine Fourier coefficients in the same directions. This permits to process the original pictorial image within a frequency range.

A weight member puts weight on the Fourier coefficients along the different directions to emphasize an obscure portion of the original pictorial image.

The weighted Fourier coefficients along the different directions are treated with an inverse Fourier transformation to determine corresponding minute amplitude value emphasis data. A synthesizing member synthesizes the corresponding minute amplitude value emphasis data to determine an image data in which the minute amplitude value is emphasized.

Upon applying to a fingerprint verification device, a clear fingerprint image is insured in which the obscure portion is rectified to identify the entrant with a high accuracy. Upon applying to a read-out of an automobile license plate number, a clarified license plate number image is insured in which the obscure portion is rectified to identify the license plate number with a high accuracy.

Depending on the direction in which the original pictorial image is treated with the Fourier transformation, information from the fingerprint ridge lines may be subjected to an attenuation. By synthesizing the data in different directions, the attenuation is suppressed effectively.

According to another aspect of the invention, the different directions are represented by two lines met at right angles. This also suppresses the attenuation effectively.

According to still another aspect of the invention, the different directions are represented by a longitudinal line (y-axis direction) and a latitudinal line (x-axis direction) of the original pictorial image. This not only suppresses the attenuation, but also eliminates the necessity of implementing coordinates transformation substantially. With a common analysis size applied herein, the verification is implemented at a higher speed.

BRIEF DESCRIPTION OF THE DRAWINGS

Preferred forms of the present invention are illustrated in the accompanying drawings in which:

FIG. 6 is a graphical representation showing a relationship between (n) and a normalized weight in a weight function (A3).

DETAILED DESCRIPTION OF THE PREFERRED EMBODIMENTS

Figure 1:
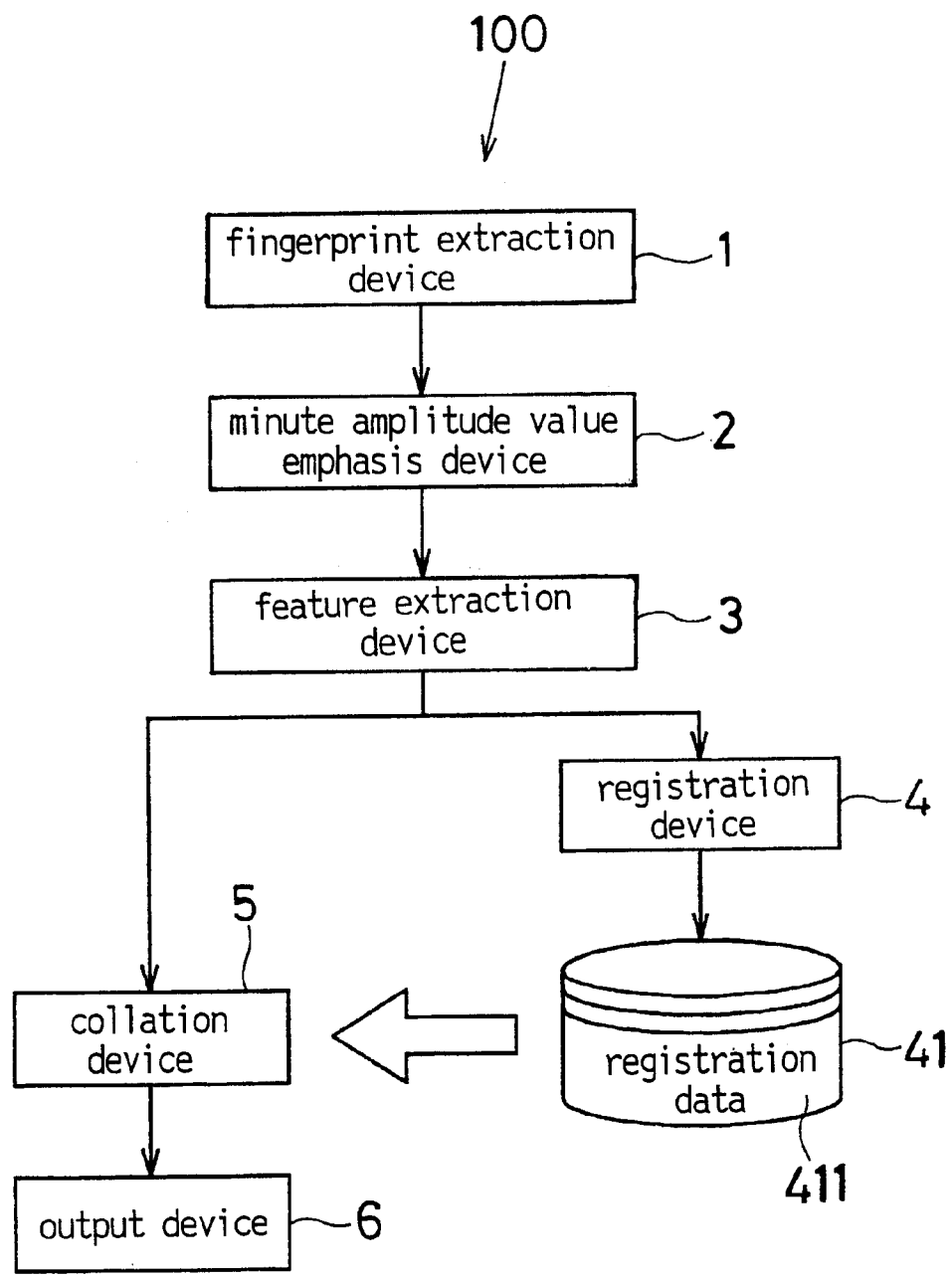
FIG. 1 is an explanatory view of an individual identification device into which an image emphasizing device is incorporated according to an embodiment of the invention.
Figure 2:
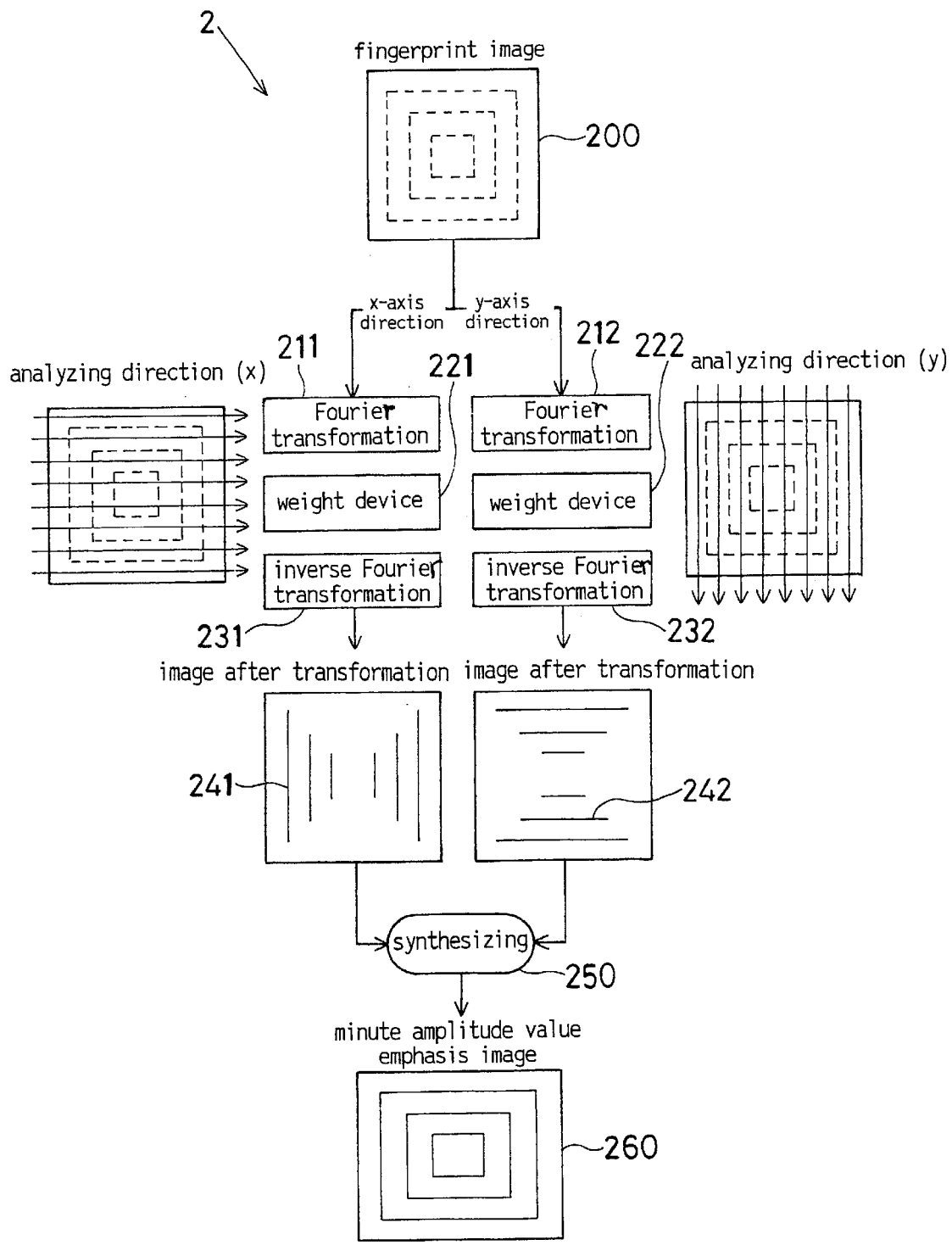
FIG. 2 is an explanatory view of a minute amplitude emphasis device.
Figure 3:
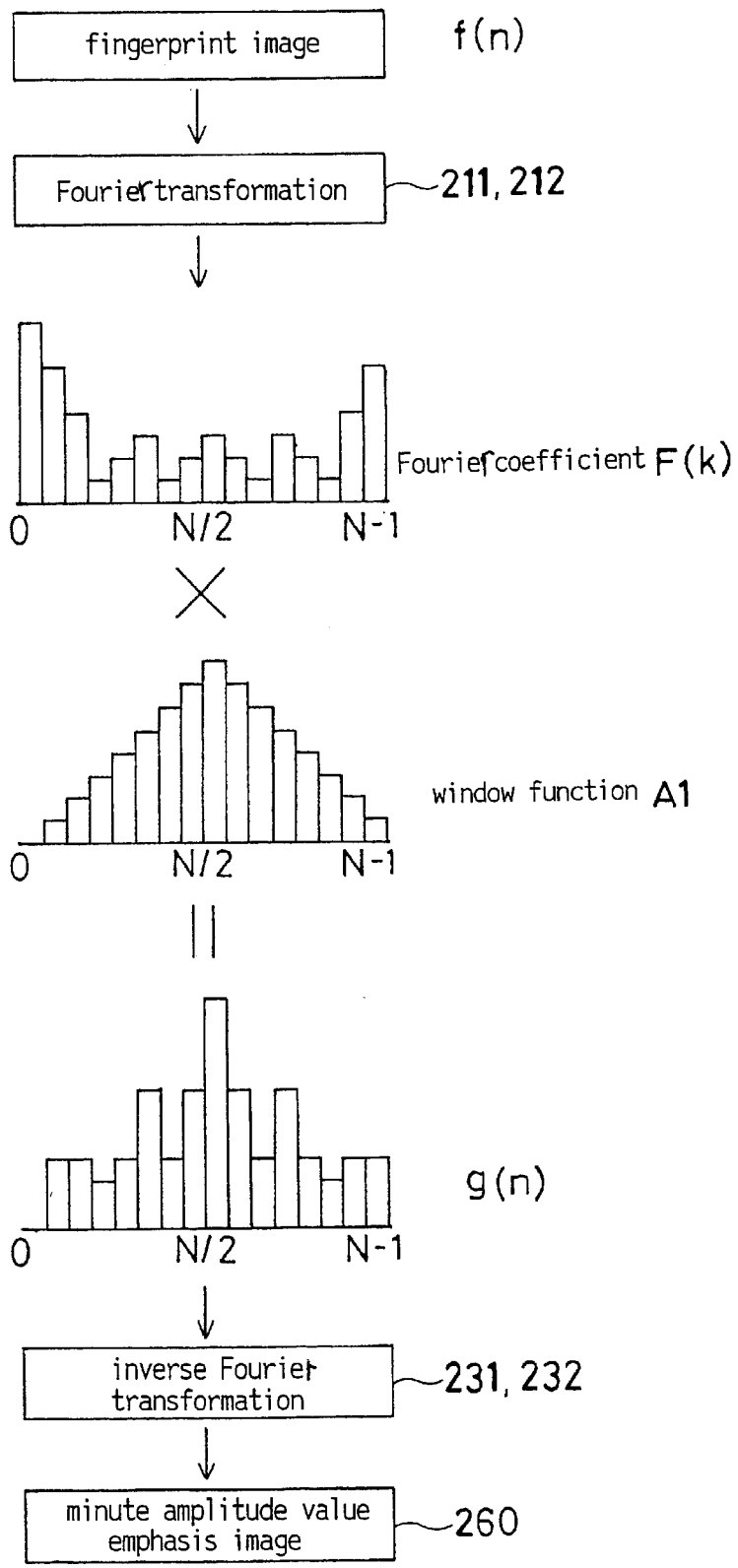
FIG. 3 is sequential views showing how a fingerprint image is emphasized.

Referring to FIGS. 1 through 3 which show an embodiment of the invention, FIG. 1 depicts an individual identification device 100 into which an image emphasizing device is incorporated. The individual identification device 100 has a fingerprint extraction device 1 on which an entrant puts his or her finger tip. A minute amplitude value emphasis device 2 is provided to emphasize a minute amplitude value derived from a fingerprint image.

In the individual identification device 100, a feature extraction device 3, a registration device 4, a collation device 5 and an output device 6 are each provided.

The fingerprint extraction device 1 has a right-angled prism (not shown) on which an index finger tip is put. A light source and a charge-coupled device (CCD) are provided in a fashion to straddle the prism therebetween although not shown. The charge-coupled device reads swelled portions of fingerprint ridge lines as dark image, and reading valleys of the fingerprint ridge lines as bright image so as to form a fingerprint image 200 (original pictorial image) which is fed to the minute amplitude value emphasis device 2 as two-dimensional dark and bright signal f(n). A size of the fingerprint image 200 is 94×120 (pixel).

As shown in FIG. 2, the minute amplitude value emphasis device 2 has Fourier transformation devices 211, 212, weight devices 221, 222, inverse Fourier transformation devices 231, 232 and a synthesizing device 250.

The Fourier transformation devices 211, 212 treat the dark and bright signal f(n) with a Fourier transformation in x-axis (latitudinal) and y-axis (longitudinal) directions.

The following are reasons why the dark and bright signal f(n) is treated with the Fourier transformation in x-axis and y-axis directions respectively.

When the fingerprint image 200 is subjected in turn to the Fourier transformation in y-axis direction → a weighting procedure → the inverse Fourier transformation, the fingerprint ridge lines are emphasized more as the lines become parallel to y-axis direction.

As a result, the fingerprint image thus produced is attenuated in the ridge lines parallel to the longitudinal direction as shown at a minute amplitude value emphasis data 242.

In order to avoid this inconvenience, the fingerprint image 200 is subjected in turn to the Fourier transformation in x-axis direction → the weighting procedure → the inverse Fourier transformation to produce a minute amplitude value emphasis data 241. These data 241, 242 are synthesized to produce a minute amplitude value emphasis image.

Among the minute amplitude value emphasis data 242, the fingerprint ridge lines subjected to the Fourier transformation in y-axis direction meet latitudinal ridge lines at right angles. Among the minute amplitude value emphasis data 241, the fingerprint ridge lines subjected to the Fourier transformation in x-axis direction meet longitudinal ridge lines at right angles. This attenuates the ridge lines perpendicular to the direction in which the ridge lines are subjected to the Fourier transformation.

Weight devices 221, 222 multiply a real number component ($a_k$) of a Fourier coefficient F(k) in each direction by a window function (A1). The Fourier coefficient F(k) and the window (weight) function (A1) are expressed below.

$$F(k) = \sum_{n=0}^{N-1} f(n) e^{-j\frac{2\pi k}{N}} = a_k + jb_k$$

$$A1 = \begin{cases} k & \text{if } k \leq \frac{N}{2} \\ (N-k) & \text{if } k > \frac{N}{2} \end{cases}$$

This emphasizes an obscure portion (high frequency range) in which the fingerprint ridge lines are blurred. This means that the ridge lines are emphasized which are perpendicular to the direction in which the ridge lines are subjected to the Fourier transformation.

A feature extraction device 3 uses group delay spectra (GDS) which emphasizes peak values by removing envelope components of spectra obtained from a linear prediction analysis. By altering the window function (A1), it is possible to change an emphatic characteristics without replacing a fundamental algorism.

In order to attain the minute amplitude value emphasis data 241, 242 in which minute amplitude values of the fingerprint ridge lines are emphasized in each direction, inverse Fourier transformation devices 231, 232 treat the Fourier coefficient with an inverse Fourier transformation in each direction so as to produce a time series signal g(n) represented as below.

$$g(n) = \frac{1}{N} \sum_{k=0}^{N-1} (Aa_k + jb_k) e^{j\frac{2\pi k}{N}}$$

A synthesizing device 250 synthetically combines the minute amplitude value emphasis data 241, 242 to produce a minute amplitude value emphasis image 260. Upon synthesizing these data 241, 242, Dark and bright values are averaged where corresponding coordinates meet. Instead of using an average value, one of the minute amplitude value emphasis data 241, 242 may be preferentially employed upon synthesizing these data 241, 242.

By way of illustration, the minute amplitude value emphasis data 241, 242 in x-axis and y-axis directions may be proportionally alloted by an increased range of 10 to 50% in favor of one of the minute amplitude value emphasis data 241, 242 upon synthesizing the minute amplitude value emphasis data 241, 242.

In this instance, the dark and bright values may be calculated as a geometric means instead of the average and the proportional allotment.

The feature extraction device 3 has a pretreatment section and an extraction section. The pretreatment section calibrates a contrast and implements a cut-out for the minute amplitude value emphasis image 260 in which the minute amplitude value is emphasized.

The extraction section uses the group delay spectra (GDS) in which the peak values are emphasized by removing the envelope components of spectra obtained from the linear prediction analysis. This means that the minute amplitude value emphasis image 260 is analyzed in x-axis and y-axis directions to obtain two group delay spectra (GDS).

Figure 4:
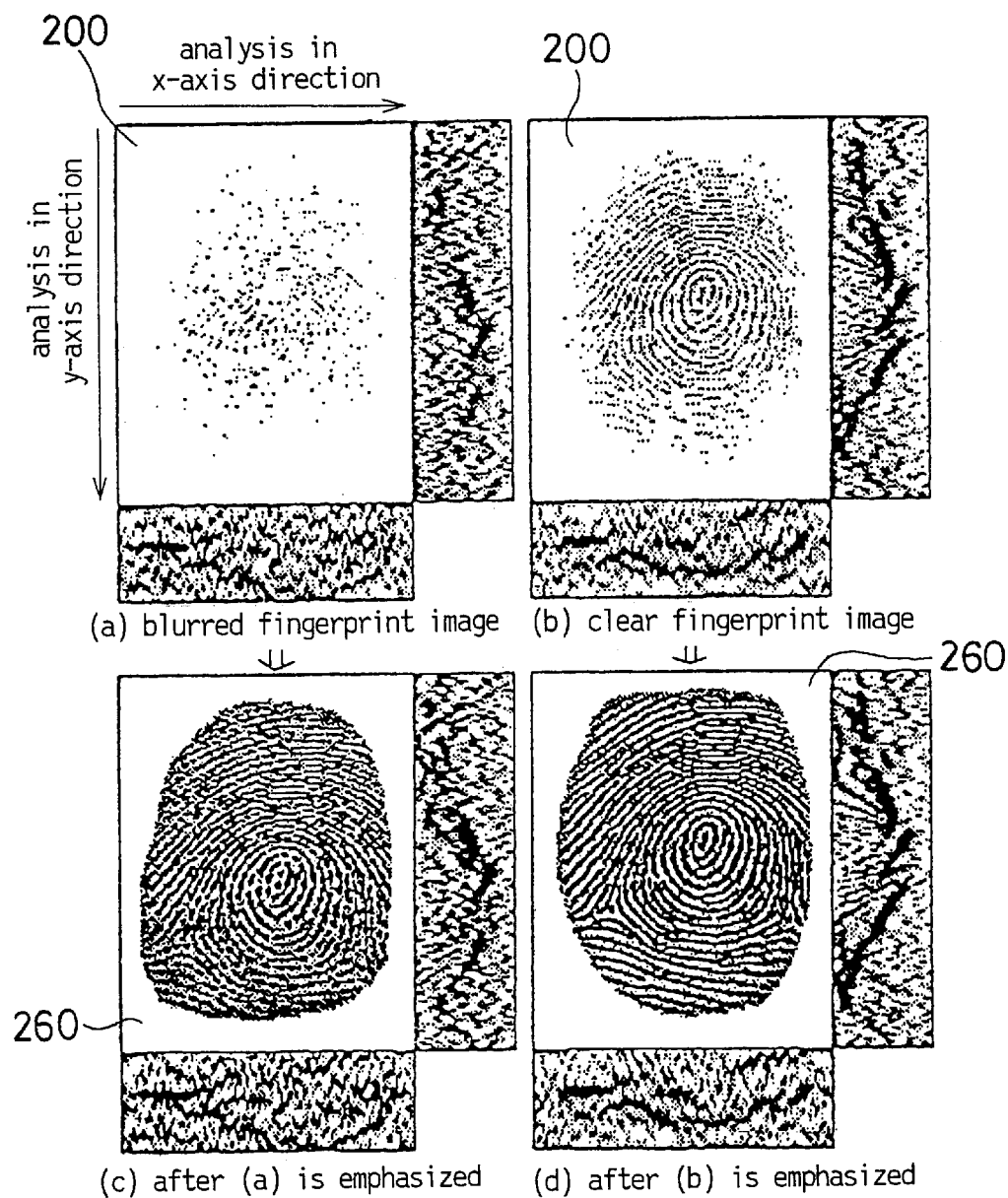
FIGS. 4(a)–(d) is photographic representations showing how obscure fingerprint images are rectified into clear fingerprint images.

FIG. 4 shows the fingerprint image 200 and data obtained by treating the image 200 with GDS as indicated at (a) and (b). By treating the minute amplitude value emphasis image 260 with GDS as shown at (c) and (d), images are obtained as depicted at right and lower sides of the minute amplitude value emphasis image 260. It is to be noted that end points and bifurcation points and number of the ridge lines may be considered during the process in which the feature extraction is implemented.

When the GDS is used, the GDS may be quantized (e.g., 4-bit) to reduce the data size while insuring a high collation speed. A quantized range and number of the quantized bit may be dynamically or experimentally sought. Parameters needed to transform into GDS are predetermined in accordance with optimum values for the fingerprint image 200.

Feature extraction data obtained from the feature extraction device 3 is fed to the registration device 4. The registration device 4 has a memory 41 (hard disc or flash memory) and a registration control section.

The registration control section recognizes whether the following registration complete requirement is met when the entrant is registered. If met, a registration data 411 is stored as entrant feature extraction data in the memory 41. If not met, a routine of "fingerprint extraction" → "minute amplitude value emphasis" → "feature extraction" is repeated until satisfied.

Registration Complete Requirement

When a single finger tip satisfies, for example, five registration items (n items in general) among requisite data to be registered. When satisfied, the registration routine ends.

The collation device 5 has a temporary memory section and a collation control section.

The temporary memory section stores the feature extraction data as collation data when collating the registrant fingerprint with the entrant one to identify the entrant.

The collation control section compares the collation data stored in the temporary memory section with the registration data 411 stored in the memory 41 of the registration device 4.

Upon collating the fingerprints, the collation is implemented in terms of distance in GDS. The collation data are compared with a set of registration data which contains five registration items collected five times from the fingerprint per single finger tip by way of illustration.

In this instance, the collation data may be compared with pluralistic sets of the registration data.

When the distance in GDS corresponds to a threshold value or less, the collation device 5 recognizes that the collation data resemble the registration data 411 enough to identify the entrant fingerprint with the registrant one so as to verify the entrant with the registrant.

When the distance in GDS exceeds the threshold value, the collation device 5 does not recognize that the collation data resemble the registration data 411 enough to identify the entrant fingerprint with the registrant one.

When the entrant is verified, the output device 6 indicates "Permission For Entrance" on a display to generate a signal to unlock a door while recording an issuance of the "Permission". When not verified, the output device 6 indicates "No Permission For Entrance" on the display to generate a signal to activate a buzzer while recording an issuance of the "No Permission".

An experimental test was carried out to confirm the advantages which the minute amplitude value emphasis device 2 had produced.

Experimental Data

The fingerprint image 200 was originated from twenty fingerprints each adopted from fifty-seven registration volunteers in each month from February to August in Japan The fingerprint image is illustrated at (a), (b) in FIG. 4, and the minute amplitude value emphasis image at (c), (d) in the same Figure.

Experimental Method

Five registration patterns were selected at random from the fingerprint data adopted in April, and the rest and the registration data adopted in the other months were used for estimation. Distances in registration pattern and estimation pattern in terms of GDS were measured with the use of DP matching.

Suppose $d_x$ and $d_y$ to be distances in x-axis and y-axis directions, a minimum value was an estimation value selected among five types of distances obtained as $d_{i=\alpha} d_x + (1-\alpha) d_y (i=1, 2, ---, 5)$.

Where $\alpha$ is an experimental value represented by a highest collation rate, and the threshold value was determined so that the rejection rate was 99.9% when the entrant was made unidentifiable. When the entrant was not verified with the registrant, the minute amplitude value emphasis image 260 was used to collate the former with the latter.

Experimental Test Results

Figure 5:
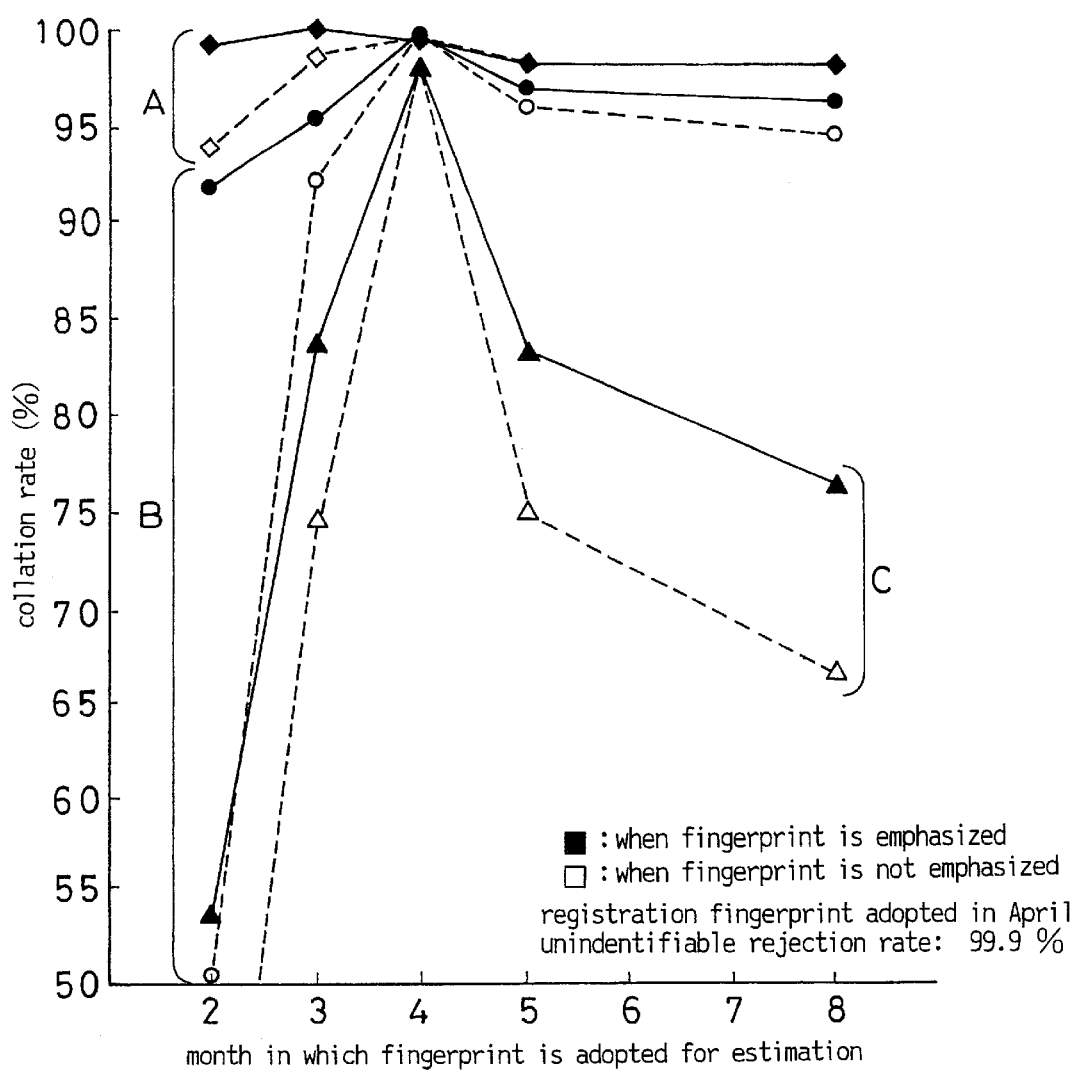
FIG. 5 is a graphical representation showing how an collating accuracy changes depending on what season a fingerprint is taken in each group.

Experimental Test Results are shown in FIG. 5. The fifty-seven registration volunteers were divided into three groups.

Group (A) belongs to the subjects which represent clarified fingerprints.

Group (B) belongs to the subjects which represent fingerprints often obscured in February.

Group (C) belongs to the subjects which particularly represent blurred fingerprints.

The fingerprint data in February contain many blurred fingerprints to increase the distances against the registration patterns to worsen the collation rate when treating the fingerprint image 200 with GDS. On the contrary, it is confirmed that the use of the minute amplitude value emphasis device 2 increases the collation rate by 40% or more.

Advantages Achieved

When putting the finger tip on the fingerprint extraction device 1, the fingerprint image 200 becomes unclear in which some of the ridge lines are lost and blurred due to dry, sweaty, injured, chappy finger tip, particular seasons (summer or winter), or an advertent finger pressure shortage.

In these situations, the minute amplitude value emphasis device 2 emphasizes the blurred fingerprint ridge lines to reproduce the fingerprint image as clear as that adopted under a good condition in which the fingerprint is placed in a tight contact with the prism of the fingerprint extraction device 1. This means that the collation rate is significantly improved under the adverse circumstances (e.g., especially dry winter season) as shown in FIG. 5.

Since the alteration of the window function (A1) changes the emphatic characteristics without replacing a fundamental algorism, blurred portions are effectively emphasized by using the window function appropriate for the pictorial image components and the fingerprint ridge lines. Instead of the window function (A1), such window (weight) functions as represented by (A2) and (A3) are applied herein.

$$A2 = \begin{cases} k^m & \text{if } k \leq \frac{N}{2} \\ (N-k)^m & \text{if } k > \frac{N}{2} \end{cases}$$

$$A3 = \begin{cases} k^s e^{-\frac{k^2}{2\tau^2}} & \text{if } k \leq \frac{N}{2} \\ (N-k)^s e^{-\frac{(N-k)^2}{2\tau^2}} & \text{if } k > \frac{N}{2} \end{cases}$$

The window function (A3) suppresses a low frequency range while emphasizing a middle frequency range and suppressing a high frequency range greater than that of the fingerprint ridge lines.

By determining a parameter ($\tau$) to be appropriate for the fingerprint, the original pictorial image is effectively emphasized as shown in FIG. 6.

While there has been described what is at present thought to be preferred embodiments of the invention, it will be understood that modifications may be made therein and it is intended to cover in the appended claims all such modifications which fall within the scope of the invention.

What is claimed is:

1. An image emphasizing device, comprising:
   a Fourier transformation member provided to treat an original pictorial image with a one-dimensional Fourier transformation along different directions so as to determine respective Fourier coefficients;
   a weight member provided to emphasize an obscure image represented by a minute amplitude value along said respective Fourier coefficients in the corresponding directions so as to produce weighted Fourier coefficients;
   an inverse Fourier transformation member provided to treat said weighted Fourier coefficients with a one dimensional inverse Fourier transformation in said different directions to determine corresponding minute amplitude value emphasis data;

a synthesizing member provided to synthesize said corresponding minute amplitude value emphasis data to determine an image data in which said minute amplitude value is emphasized;

a feature extraction member provided to analyze said image data with the use of group delay spectra in said different directions in which peak values are emphasized by removing envelope components of spectra obtained from a linear prediction analysis;

a registration member provided to recognize whether or not a registration requirement is satisfied on the basis of a feature extraction data obtained from said feature extraction member, said feature extraction data being stored in a memory as a registration data when said registration requirement is satisfied; and a collation member provided to collate said registration data with a collation data derived from a feature extraction data of an entrant, said registration data being collated with said collation data in terms of a distance when said distance is a threshold value or less than said threshold value, wherein said Fourier coefficient is represented by F(k), said weight member is represented by (A2), and said weighted Fourier coefficients are processed with said one-dimensional inverse Fourier transformation to obtain a time series g(n), $$\text{Where} \quad F(k) = \sum_{n=0}^{N-1} f(n)e^{-j\frac{2\pi k}{N}} = a_k + jb_k$$

$$A2 = \begin{cases} k^m & \text{if } k \leq \frac{N}{2} \\ (N-k)^m & \text{if } k > \frac{N}{2} \end{cases}$$

$$g(n) = \frac{1}{N}\sum_{k=0}^{N-1}(Aa_k + jb_k)e^{j\frac{2\pi k}{N}}.$$

2. An image emphasizing device, comprising:

a Fourier transformation member provided to treat an original pictorial image with a one-dimensional Fourier transformation along different directions so as to determine respective Fourier coefficients;

a weight member provided to emphasize an obscure image represented by a minute amplitude value along said respective Fourier coefficients in the corresponding directions so as to produce weighted Fourier coefficients;

an inverse Fourier transformation member provided to treat said weighted Fourier coefficients with a one dimensional inverse Fourier transformation in said different directions to determine corresponding minute amplitude value emphasis data;

a synthesizing member provided to synthesize said corresponding minute amplitude value emphasis data to determine an image data in which said minute amplitude value is emphasized;

a feature extraction member provided to analyze said image data with the use of group delay spectra in said different directions in which peak values are emphasized by removing envelope components of spectra obtained from a linear prediction analysis;

a registration member provided to recognize whether or not a registration requirement is satisfied on the basis of a feature extraction data obtained from said feature extraction member, said feature extraction data being stored in a memory as a registration data when said registration requirement is satisfied; and a collation member provided to collate said registration data with a collation data derived from a feature extraction data of an entrant, said registration data being collated with said collation data in terms of a distance when said distance is a threshold value or less than said threshold value, wherein said Fourier coefficient is represented by F(k), said weight member is represented by (A3), and said weighted Fourier coefficients are processed with said one-dimensional inverse Fourier transformation to obtain a time series g(n), $$\text{Where} \quad F(k) = \sum_{n=0}^{N-1} f(n)e^{-j\frac{2\pi k}{N}} = a_k + jb_k$$

$$A3 = \begin{cases} k^s e^{-\frac{k^2}{2\tau^2}} & \text{if } k \leq \frac{N}{2} \\ (N-k)^s e^{-\frac{(N-k)^2}{2\tau^2}} & \text{if } k > \frac{N}{2} \end{cases}$$

$$g(n) = \frac{1}{N}\sum_{k=0}^{N-1}(Aa_k + jb_k)e^{j\frac{2\pi k}{N}}.$$

3. An image emphasizing device, comprising:

a Fourier transformation member provided to treat an original pictorial image with a one-dimensional Fourier transformation along different directions so as to determine respective Fourier coefficients;

a weight member provided to emphasize an obscure image represented by a minute amplitude value along said respective Fourier coefficients in the corresponding directions so as to produce weighted Fourier coefficients;

an inverse Fourier transformation member provided to treat said weighted Fourier coefficients with a one dimensional inverse Fourier transformation in said different directions to determine corresponding minute amplitude value emphasis data;

a synthesizing member provided to synthesize said corresponding minute amplitude value emphasis data to determine an image data in which said minute amplitude value is emphasized;

a feature extraction member provided to analyze said image data with the use of group delay spectra in said different directions in which peak values are emphasized by removing envelope components of spectra obtained from a linear prediction analysis;

a registration member provided to recognize whether or not a registration requirement is satisfied on the basis of a feature extraction data obtained from said feature extraction member, said feature extraction data being stored in a memory as a registration data when said registration requirement is satisfied; and a collation member provided to collate said registration data with a collation data derived from a feature extraction data of an entrant, said registration data being collated with said collation data in terms of a distance when said distance is a threshold value or less than said threshold value, wherein said amplitude characteristics emphasis data in said different directions are proportionally alloted by an increased range of 10 to 50% in favor of one of said amplitude characteristics emphasis data upon synthesizing said amplitude characteristics emphasis data.

4. An image emphasizing device comprising:

a Fourier transformation member provided to treat an original pictorial image with a one-dimensional Fourier transformation along different directions so as to determine respective Fourier coefficients;.

a weight member provided to emphasize an obscure image represented by a minute amplitude value along said respective Fourier coefficients in the corresponding directions so as to produce weighted Fourier coefficients;

an inverse Fourier transformation member provided to treat said weighted Fourier coefficients with a one-dimensional inverse Fourier transformation in said different directions to determine corresponding minute amplitude value emphasis data;

a synthesizing member provided to synthesize said corresponding minute amplitude value emphasis data to determine an image data in which said minute amplitude value is emphasized;

a feature extraction member provided to analyze said image data with the use of group delay spectra in said different directions in which peak values are emphasized by removing envelope components of spectra obtained from a linear prediction analysis;

a registration member provided to recognize whether or not a registration requirement is satisfied on the basis of a feature extraction data obtained from said feature extraction member, said feature extraction data being stored in a memory as a registration data when said registration requirement is satisfied;

a collation member provided to collate said registration data with a collation data derived from a feature extraction data of an entrant, said registration data being collated with said collation data in terms of a distance when said distance is a threshold value or less than said threshold value, wherein said Fourier coefficient is represented by F(k), said weight member is represented by (A3), and said weighted Fourier coefficients are processed with said one-dimensional inverse Fourier transformation to obtain a time series g(n), $$\text{Where } F(k) = \sum_{n=0}^{N-1} f(n)e^{-j\frac{2\pi k}{N}} = a_k + jb_k$$

$$A3 = \begin{cases} f(k) & \text{if } k \leq \frac{N}{2} \\ f(N-k) & \text{if } k > \frac{N}{2} \end{cases}$$

$$g(n) = \frac{1}{N}\sum_{k=0}^{N-1}(Aa_k + jb_k)e^{j\frac{2\pi k}{N}}.$$

5. An image emphasizing device comprising:

a Fourier transformation member provided to treat an original pictorial image with a one-dimensional Fourier transformation along different directions so as to determine respective Fourier coefficients;

a weight member provided to emphasize an obscure image represented by a minute amplitude value along said respective Fourier coefficients in the corresponding directions so as to produce weighted Fourier coefficients;

an inverse Fourier transformation member provided to treat said weighted Fourier coefficients with a one-dimensional inverse Fourier transformation in said different directions to determine corresponding minute amplitude value emphasis data;

a synthesizing member provided to synthesize said corresponding minute amplitude value emphasis data to determine an image data in which said minute amplitude value is emphasized;

a feature extraction member provided to analyze said image data with the use of group delay spectra in said different directions in which peak values are emphasized by removing envelope components of spectra obtained from a linear prediction analysis;

a registration member provided to recognize whether or not a registration requirement is satisfied on the basis of a feature extraction data obtained from said feature extraction member, said feature extraction data being stored in a memory as a registration data when said registration requirement is satisfied;

a collation member provided to collate said registration data with a collation data derived from a feature extraction data of an entrant, said registration data being collated with said collation data in terms of a distance when said distance is a threshold value or less than said threshold value, wherein said Fourier coefficient is represented by F(k), said weight member is represented by (A4), and said weighted Fourier coefficients are processed with said one-dimensional inverse Fourier transformation to obtain a time series g(n), $$\text{Where } F(k) = \sum_{n=0}^{N-1} f(n)e^{-j\frac{2\pi k}{N}} = a_k + jb_k$$

$$A3 = \begin{cases} f(k) & \text{if } k \leq \frac{N}{2} \\ f(N-k) & \text{if } k > \frac{N}{2} \end{cases}$$

$$g(n) = \frac{1}{N}\sum_{k=0}^{N-1}A(a_k + jb_k)e^{j\frac{2\pi k}{N}}$$

and f(k) represents a coefficient which reflects a value in connection with a statistically obtained distribution of a fingerprint ridge pitch, or a function showing a local maximum value at a frequency band region near the fingerprint ridge pitch.

6. An image emphasizing device comprising:

a Fourier transformation member provided to treat an original pictorial image with a one-dimensional Fourier transformation along different directions so as to determine respective Fourier coefficients;

a weight member provided to emphasize an obscure image represented by a minute amplitude value along said respective Fourier coefficients in the corresponding directions so as to produce weighted Fourier coefficients;

an inverse Fourier transformation member provided to treat said weighted Fourier coefficients with a one-dimensional inverse Fourier transformation in said different directions to determine corresponding minute amplitude value emphasis data;

a synthesizing member provided to synthesize said corresponding minute amplitude value emphasis data to determine an image data in which said minute amplitude value is emphasized;

a feature extraction member provided to analyze said image data with the use of group delay spectra in said different directions in which peak values are emphasized by removing envelope components of spectra obtained from a linear prediction analysis;

a registration member provided to recognize whether or nota registration requirement is satisfied on the basis of a feature extraction data obtained from said feature extraction member, said feature extraction data being stored in a memory as a registration data when said registration requirement is satisfied;

a collation member provided to collate said registration data with a collation data derived from a feature extraction data of an entrant, said registration data being collated with said collation data in terms of a distance when said distance is a threshold value or less than said threshold value, wherein said Fourier coefficient is represented by F(k), said weight member is represented by (A5), (B5), and said weighted Fourier coefficients are processed with said one-dimensional inverse Fourier transformation to obtain a time series g(n), Where $F(k) = \sum_{n=0}^{N-1} f(n)e^{-j\frac{2\pi k}{N}} = a_k + jb_k$ $A5 = \begin{cases} f(k) & \text{if } k \leq \frac{N}{2} \\ f(N-k) & \text{if } k > \frac{N}{2} \end{cases}$ $B5 = \begin{cases} h(k) & \text{if } k \leq \frac{N}{2} \\ h(N-k) & \text{if } k > \frac{N}{2} \end{cases}$ $g(n) = \frac{1}{N}\sum_{k=0}^{N-1}(Aa_k + jBb_k)e^{j\frac{2\pi k}{N}}$ and f(k) and h(k) represent coefficients which reflect a value in connection with a statistically obtained distribution of a fingerprint ridge pitch, or a function showing a local maximum value at a frequency band region near the fingerprint ridge pitch.

7. The image emphasizing device as recited in claims 1, 2, 3, 4, 5 or 6, wherein said different directions are represented by two lines met at right angles.

8. The image emphasizing device as recited in claims 1, 2, 3, 4, 5 or 6, wherein said different directions are represented by longitudinal and latitudinal lines of said original pictorial image.

9. The image emphasizing device as recited in claims 1, 2, 3, 4, 5 or 6, wherein said original pictorial image is a fingerprint image data in which a fingerprint image is emphasized.

10. The image emphasizing device as recited in claims 1, 2, 3, 4, 5 or 6, wherein said minute amplitude value in said different directions are calculated by a geometric means upon synthesizing said minute amplitude value emphasis data.

11. An image emphasizing device comprising:

a Fourier transformation member provided to treat an original pictorial image with a one-dimensional Fourier transformation along different directions so as to determine respective Fourier coefficients;

a weight member provided to emphasize an obscure image represented by a minute amplitude value along said respective Fourier coefficients in the corresponding directions so as to produce weighted Fourier coefficients;

an inverse Fourier transformation member provided to treat said weighted Fourier coefficients with a one-dimensional inverse Fourier transformation in said different directions to determine corresponding minute amplitude value emphasis data; and a synthesizing member provided to synthesize said corresponding minute amplitude value emphasis data to determine an image data in which said minute amplitude value is emphasized wherein said minute amplitude value in said different directions being proportionally alloted by an increased range of 10 to 50% in favor of one of said minute amplitude value emphasis data upon synthesizing said minute amplitude value emphasis data.

12. The image emphasizing device, as recited in claim 11, wherein said minute amplitude value in said different directions are calculated by a geometric means upon synthesizing said minute amplitude value emphasis data.

13. The image emphasizing device as recited in any one of claims 11 and 12, wherein a feature extraction member is provided to analyze said image data with the use of group delay spectra in said different directions by removing envelope components of spectra obtained from a linear prediction analysis.

* * * * *